United States Patent [19]
von der Heide

[11] Patent Number: 4,664,009
[45] Date of Patent: May 12, 1987

[54] METHOD AND APPARATUS FOR CUTTING PARTICULARLY COMPACTED CROP HARVEST OR SILAGE MATERIAL

[76] Inventor: Hans von der Heide, Ibbenbürener Strasse 17, 4533 Laggenbeck, Fed. Rep. of Germany

[21] Appl. No.: 779,250

[22] Filed: Sep. 23, 1985

[30] Foreign Application Priority Data

Sep. 28, 1984 [DE] Fed. Rep. of Germany ...... 3435702

[51] Int. Cl.⁴ .............................................. B26D 7/01
[52] U.S. Cl. ........................................ 83/747; 83/701; 83/751
[58] Field of Search ................ 83/747, 746, 701, 751; 30/272 A, 272 R; 56/236, 264

[56] References Cited

U.S. PATENT DOCUMENTS

| | | | |
|---|---|---|---|
| 2,475,683 | 7/1949 | Topham | 83/747 X |
| 3,316,636 | 5/1967 | Raper, Jr. et al. | 30/272 A X |
| 3,525,278 | 8/1970 | Sagona | 83/747 |
| 4,336,732 | 6/1982 | Liet et al. | 83/747 |
| 4,436,013 | 3/1984 | Gerber | 83/747 |

FOREIGN PATENT DOCUMENTS 2513560  1/1983  France .................................. 83/747

Primary Examiner—James F. Coan
Attorney, Agent, or Firm—Felfe & Lynch

[57] ABSTRACT

A method and apparatus for cutting compacted crop or silage material are accomplished by a pair of oppositely reciprocating blades which have a pivotal motion about a line lengthwise of the cutting blades.

8 Claims, 3 Drawing Figures

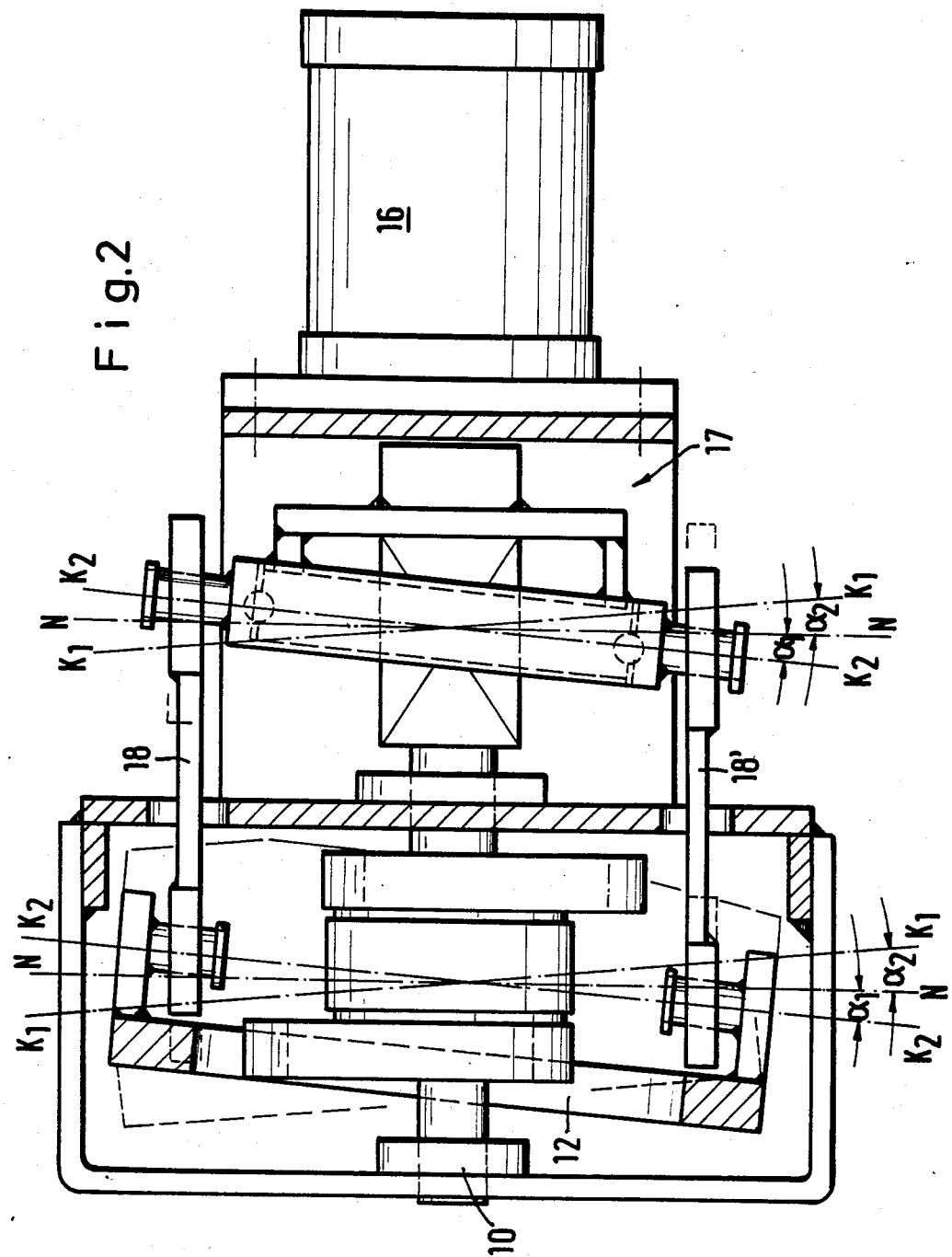

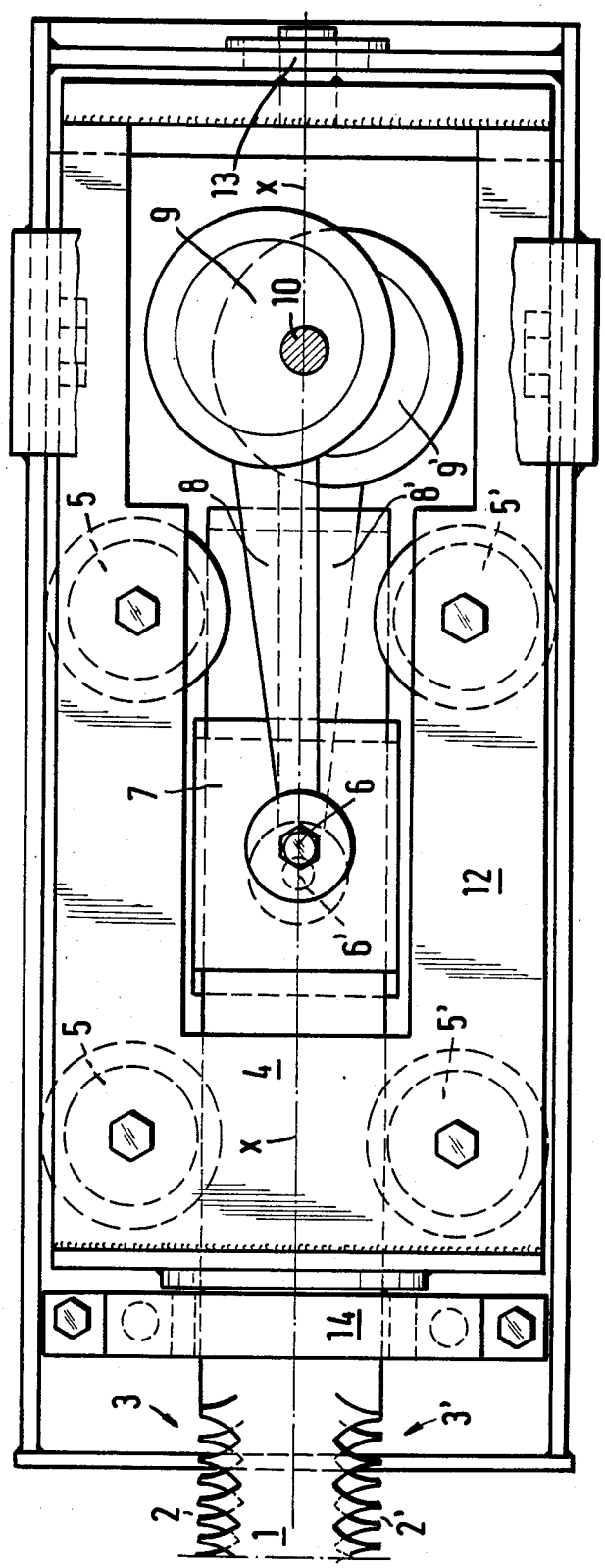

METHOD AND APPARATUS FOR CUTTING PARTICULARLY COMPACTED CROP HARVEST OR SILAGE MATERIAL

The present invention relates to a method and a cutting apparatus for the cutting (or slicing) of particularly compacted harvest (crop) or silage material, wherein cuts are made through the material by means of at least one cutter including a blade which reciprocates in course of the cutting operation and which cuts continuously in the direction of a cutting plane, to separate (cutup) portions from the material.

Cutting (or slicing) operations of the above-indicated kind in which freshly compacted or stored harvest (crop) or silage materials containing fibrous natural products are cut up in the form of portions from the stack or heap, are accompanied by substantial, unexpected difficulties. In view of the fact that relatively long knives or cutters guided on one side and provided with cutting teeth in a manner similar to a tenon saw are used for the cutting of a relatively large fodder pack or stack or fodder heap as described in the applicant's prior U.S. Pat. No. 4,367,855, German patent No. 2,307,689, and U.S. patent application Ser. No. 511,307, the disclosures of which relative to such knives or cutters and other matters as may be common hereto are incorporated by reference, heretofore it could not be avoided in practice that the cutters deviated, for example, in one direction from the given cutting plane and further jammed in the cutting gap. Frequently, this resulted in damage to the cutting apparatus, in breakage of the cutters, or at least in severe wear.

It is the object of the present invention to provide a method and a cutting apparatus by which the problems encountered in practice may be overcome. The method and the cutting apparatus are contemplated to provide for the stable, trouble-free cutting of harvest (crop) or silage materials of any kind, and to be as uncomplicated and easy as possible in operation.

In a method of the kind as outlined above, this object is solved in that in the course of the cutting operation the blade is driven with pivotal motions about its longitudinal axis, which motions define acute angles ($\alpha_1, \alpha_2$) to either side relative to the cutting plane.

In a highly suprising manner, the method according to the invention provides for an unproblematic cutting operation even in the case of freshly compacted or stored (set), moist and fibrous harvest (crop) or silage materials the cutting of which proves to be extremely difficult. Advantageously, a deviation (cutting untrue) of the cutter or cutter pair from the given cutting plane as well as binding or jamming in the long cutting passage are thereby avoided.

According to an advantageous embodiment of the method, the blade is driven with wobbling pivotal motions.

In this way, it is hereby obtained that the cutter or cutter pair cuts clear a cutting gap which is wider than the cutter or cutters, whereby binding or deviation of the cutter or cutter pair is effectively prevented from occuring. Accordingly, as the cutters are freely movable across the full length of the cut in the cutting plane, working energy is saved in spite of the widened cutting gap; consequently, wear is also reduced to a substantial degree.

Further advantageous embodiments of the method are defined by the features according to claims 3 to 6.

A cutting apparatus for the cutting up of especially compact(ed) harvest (crop) or silage material for carrying out the method according to the invention and comprising at least one cutter having a blade and being movably driven, by guiding and drive means, with a reciprocating motion and in the direction of the cutting plane is characterized by comprising auxiliary guiding and drive means adapted to impart to the blade pivotal motions about its longitudinal axis (x—x) in the course of the cutting operation.

According to one embodiment of the cutting apparatus, this apparatus is characterized by comprising cutters guided or driven in back-to-back relation to move in relatively opposite directions, and defining a cutter pair, as well as guiding and drive means by which said cutter pair is guided and driven to perform pivotal motions about its longitudinal axis (x—x) in the course of the cutting operation.

Below, the invention is illustrated in a preferred embodiment by accompanying drawings which show further advantageous details of the invention. In the drawings:

FIG. 2 shows a cutting apparatus in plan view from the rear and partially in sectional view as seen in the direction of arrow II in FIG. 1; and FIG. 3 is a front elevational view of a cutting apparatus, as seen in the direction of arrow III in FIG. 1.

Figure 1:
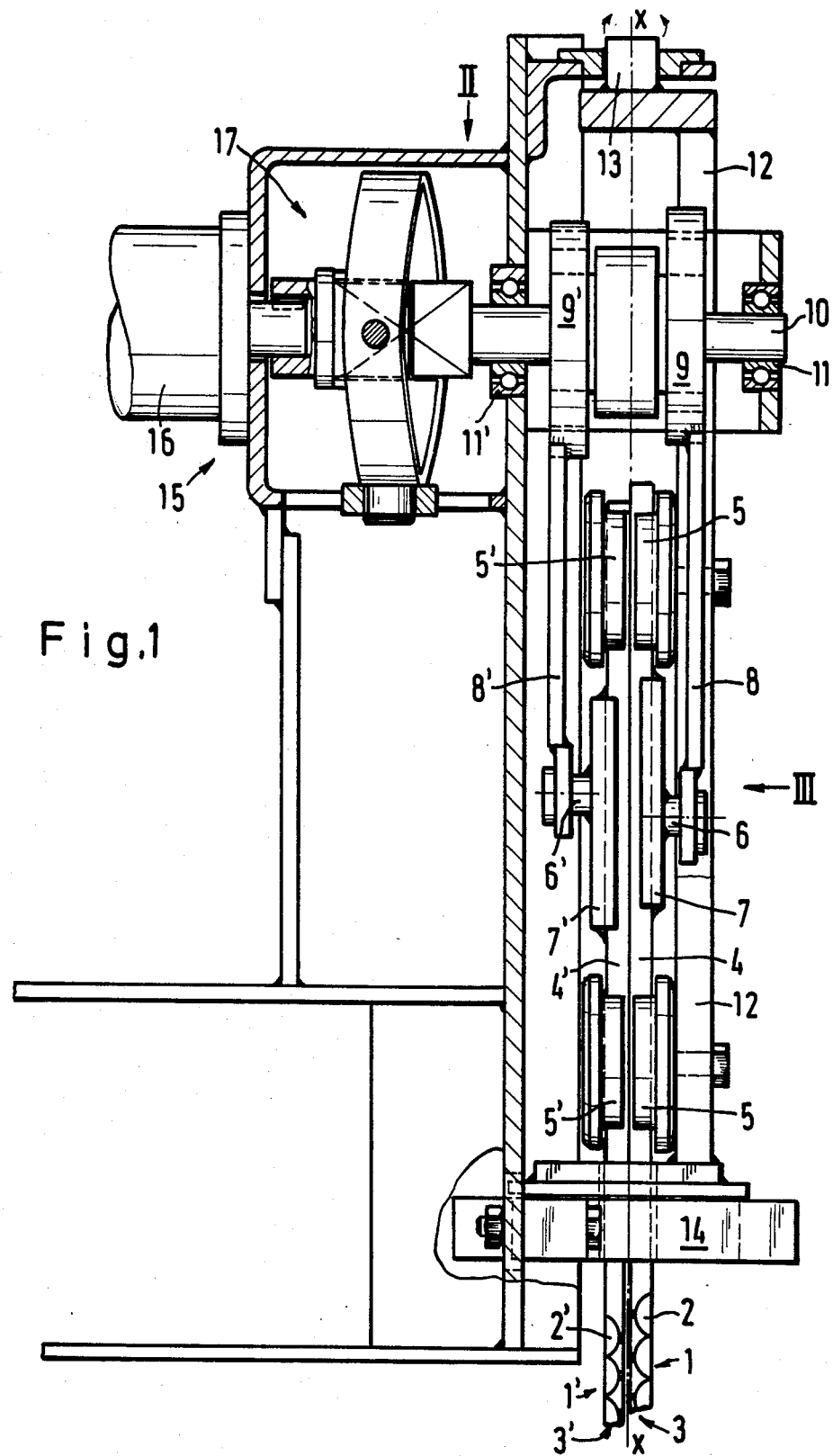
FIG. 1 is a side elevational view of a cutting apparatus, partially in sectional view.

According to FIG. 1, the cutting apparatus includes a pair of cutters 1, 1' guided in parallel with each other and in back-to-back relation. These cutters include blades 3, 3' which are provided with cutting teeth 2, 2' preferably on both sides thereof. The cutters have guiding ends 4, 4' by which the cutters are guided in guide rollers 5, 5' formed with (roller) flanges, so as to perform linear, low-friction movement in relatively opposite directions. The guiding ends 4, 4' are provided with enlargements 7, 7' formed with connecting pins 6, 6'. The connecting pins 6, 6' have pivoted thereto connecting rods 8, 8' the opposite ends of which are connected to eccentric elements 9, 9' of a crankshaft 10. This crankshaft is mounted in bearings 11, 11'. The cutters 1, 1', their guide rollers 5, 5', and the entire eccentric drive mechanism 6, 6' to 11, 11' are arranged on a rocker arm 12 which is mounted for pivotal movement about an axis x—x. A pair of bearings are provided to this end, namely the pivot bearing 13 in the lower portion of the illustration considered, and the radial anti-friction bearing 14 in the upper portion of the illustration, with only the arrangement of the casing of these bearings being shown. The purely schematically illustrated drive mechanism 15 of the crankshaft 10 includes a motor 16. Between the latter and the crankshaft 10, there is positioned a mechanism 17 for producing a rotating swinging or wobbling motion. The specific realization of the above-mentioned mechanism 17 for producing from rotation a wobbling motion is left to the designer's discretion; it may be realized by using well-known means, such that a more detailed description thereof is omitted, but a recognizable rotating, asymmetric cam and tubular cam follower are disclosed in FIGS. 1 and 2 at 17 by way of example. This rotating wobble mechanism functions in such a manner that the crankshaft 10 performs in every full rotation thereof a rocking motion from its horizontal neutral position to an inclined position towards either side, as appears from the schematical illustration of FIG. 2. In this Figure, the normal (neutral) position is identified by the thin dot-and-dash line N—N, while the two extreme rocking positions are identified by K1—K1 and K2—K2. In the course of the rocking motion of the blades 3, 3' under the action of the pivotally mounted rocker arm 12 and the mechanism 17 for producing a rotating wobbling motion, there results a maximum pivot or rocking angle $\alpha_1, \alpha_2$ of about 10° of the rocking motion around the normal line N—N which at the same time corresponds to the intended cutting plane.

Incidentally, identical functional elements are identified by identical reference numerals in FIGS. 1, 2 and 3, and particularly in FIG. 2, the mechanism 17 for producing a rotating wobbling motion is shown in a possible embodiment; here, arms 18, 18', each having both ends pivotally mounted, are provided between said mechanism and the rocker arm 12 to transmit the wobbling motion.

The functional structure of the cutting apparatus is shown in greater detail in the side elevational view of FIG. 3. This Figure illustrates the guiding or mounting of the guiding ends 4, 4' of the cutters 1, 1' in the guide rollers 5, 5' as well as the arrangement of the enlargements 7, 7' including the connecting pins 6, 6', and the positioning and functioning of the connecting rods 8, 8' which, in a well-known manner and in cooperation with the eccentric elements 9, 9' of the crankshafts, act as crank gears to impart to the cutters 1, 1' linear motion in relatively opposite directions when the crankshaft 10 rotates. Furthermore, the illustration shows the mounting of the rocker arm 12 in the pair of bearings 13 and 14, in which bearings the rocker arm is mounted for pivotal movement about the axis x—x.

The disclosed embodiment of a cutting apparatus according to the invention is shown as an example only, because the designer may adopt a variety of constructions for the functional realization of the above-mentioned elements of the cutting apparatus. Basically, however, the principle of functioning of the cutting apparatus according to the invention resides in the provision of cutters 1, 1' adapted to be pivoted or swung about the axis x—x and adapted to be tilted or rocked by a rocking mechanism, in the course of the cutting operation, from the cutting plane N—N to rocking positions K1—K1 or K2—K2, respectively, with a wobbling motion relative to the cutting plane N—N.

As the cutting operation according to the invention in a highly suprising manner readily overcomes the problems involved in practice with rigidly guided or driven cutters, the method and the cutting apparatus according to the invention constitute an optimum solution to the object as defined above.

It will be understood that the specification and examples are illustrative but not limitative of the present invention and that other embodiments within the spirit and scope of the invention will suggest themselves to those skilled in the art.

I claim:

1. A method for the cutting (or slicing) of particularly compacted harvest (crop) or silage material, wherein cuts are made through the material by means of at least one cutter including a blade which reciprocates in course of the cutting operation and which cuts continuously in the direction of a cutting plane, to separate (cut-up) portions from the material, characterized in that in the course of the cutting operation the blade is driven with pivotal motions about its longitudinal axis, which motions define acute angles ($\alpha_1, \alpha_2$) to either side relative to the cutting plane.

2. The method according to claim 1, characterized in that the blade is driven with wobbling pivotal motions.

3. The method according to claim 2, characterized in that the blade is pivoted with periodically repeating or continuing wobbling motions.

4. The method according to claim 1, characterized in that a cutting surface is produced in the cutting plane, which extends with a wavy configuration.

5. The method according to claim 1, characterized in that the pivot angle ($\alpha_1, \alpha_2$) that occurs in the pivotal motion of the blade on either side of the cutting plane, is a maximum of 10°.

6. The method according to claim 1, characterized in that the cut is made by means of two cutters which are driven in relatively opposite directions in back-to-back relation, which are moved in reciprocating fashion and in the direction of cut, and which define a cutter pair, with the cutter pair being imparted a wobbling pivotal motion about its longitudinal axis in the course of the cutting movement.

7. A cutting apparatus for the cutting up of particularly compacted harvest (crop) or silage material, comprising at least one cutter having a blade and being movably driven, by guiding and drive means, with a reciprocating motion and in the direction of the cutting plane, characterized by comprising auxiliary guiding and drive means (12, 13, 14, 17, 18) adapted to impart to the blade (3) pivotal motions about its longitudinal axis (x—x) in the course of the cutting operation.

8. The cutting apparatus according to claim 7, characterized by cutters (1, 1') guided or driven in back-to-back relation to move in relatively opposite directions, and defining a cutter pair, as well as guiding and drive means (12, 13, 14, 17, 18) by which said cutter pair (1, 1') is guided and driven to perform pivotal motions about its longitudinal axis (x—x) in the course of the cutting operation.

* * * * *